US012424747B2

(12) United States Patent
Salas Natera et al.

(10) Patent No.: US 12,424,747 B2
(45) Date of Patent: Sep. 23, 2025

(54) MULTIBAND RESONATOR ELEMENT FOR MAKING FILTERS, POLARIZERS AND FREQUENCY-SELECTIVE SURFACES

(71) Applicant: UNIVERSIDAD POLITÉCNICA DE MADRID, Madrid (ES)

(72) Inventors: Miguel Alejandro Salas Natera, Madrid (ES); Roberto Garrote Moreno, Madrid (ES); Ramón Martínez Rodríguez-Osorio, Madrid (ES); Francisco Eduardo Carrasco Yepez, Madrid (ES); José Antonio Encinar Garcinuño, Madrid (ES)

(73) Assignee: UNIVERSIDAD POLITÉCNICA DE MADRID, Madrid (ES)

( * ) Notice: Subject to any disclaimer, the term of this patent is extended or adjusted under 35 U.S.C. 154(b) by 479 days.

(21) Appl. No.: 17/775,503

(22) PCT Filed: Nov. 6, 2020

(86) PCT No.: PCT/ES2020/070686
§ 371 (c)(1),
(2) Date: May 9, 2022

(87) PCT Pub. No.: WO2021/089902
PCT Pub. Date: May 14, 2021

(65) Prior Publication Data

US 2022/0384951 A1 Dec. 1, 2022

(30) Foreign Application Priority Data

Nov. 8, 2019 (ES) ................................ ES201930982

(51) Int. Cl.
*H01Q 5/307* (2015.01)
*H01Q 9/16* (2006.01)
*H01Q 15/14* (2006.01)

(52) U.S. Cl.
CPC ............... *H01Q 5/307* (2015.01); *H01Q 9/16* (2013.01); *H01Q 15/14* (2013.01)

(58) Field of Classification Search
CPC .......... H01Q 5/307; H01Q 9/16; H01Q 15/14; H01Q 3/46; H01Q 15/0053;
(Continued)

(56) References Cited

U.S. PATENT DOCUMENTS 4,689,627 A 8/1987 Lee et al.
4,710,775 A 12/1987 Coe
(Continued)

FOREIGN PATENT DOCUMENTS

ES 2 657 486 3/2018
WO WO-2004025771 A1 * 3/2004 .......... H01P 1/20381

OTHER PUBLICATIONS

Qin et al Broadband reflectarray antenna using subwavelength elements based on double square meander line rings (Year: 216).*
(Continued)

*Primary Examiner* — Andrea Lindgren Baltzell
*Assistant Examiner* — Kimberly E Glenn
(74) *Attorney, Agent, or Firm* — Jayne Saydah

(57) ABSTRACT

A multiband resonator element which, on the one hand, compensates the components of an electromagnetic field radiated from its phase centre, located on the axis of symmetry of the resonator, to control the polarization purity of a radiating element. On the other hand, it enables the selection of the electromagnetic fields reflected and transmitted on a frequency- and multiband-selective surface. In this sense, this is an innovative element that enables the design of directive radiating elements and with an axial ratio for its circular polarization less than or equal to 1.5 dB for all the angles belonging to the hemisphere centred on broadside. Thus, it can be used in the design of reflectarrays,
(Continued)

transmitarrays and any dichroic multiband surface, likewise on metamaterial surfaces.

5 Claims, 7 Drawing Sheets

(58) Field of Classification Search
CPC ............ H01Q 15/0026; H01P 1/20309; H01P 1/2084; H01P 7/082
See application file for complete search history.

(56) References Cited

U.S. PATENT DOCUMENTS

| | | | | |
|---|---|---|---|---|
| 5,241,321 | A | 8/1993 | Tsao | |
| 5,952,971 | A | 9/1999 | Strickland | |
| 8,354,972 | B2 | 1/2013 | Borja et al. | |
| 9,151,787 | B2 * | 10/2015 | Mazzaro | G01R 27/04 |
| 2004/0119645 | A1 | 6/2004 | Lee et al. | |
| 2013/0181725 | A1 | 7/2013 | Mazzaro | |

OTHER PUBLICATIONS

English-language translation of International Search Report and Written Opinion, PCT/ES2020/070686, Universidad Politécnica De Madrid, 3 pages (Jan. 13, 2021).
Martinez-Lopez et al., "An active Ring Slot With RF MEMS Switchable Radial Stubs for Reconfigurable frequency Selective Surface Applications," México D.F.: Factulty of Engineering, National Autonomous University of Mexico, 22 pages (2012).
Shafai et al., "Dual Band Dual Polarized Radiating Element Development," de ANTEM'96, 4 pages (1996).
Sandhu et al., "Radiating Elements for Shared Aperture Tx/Rx Phased Arrays at K/Ka Band," IEEE Transactions on Antennas and Propagation, vol. 64, No. 6, pp. 2270-2282 (2016).
Fan Qin et al., "A Simple Low-Cost Shared-Aperture Dual-Band Dual-Polarized High-Gain Antenna for Synthetic Aperture Radars," IEEE Transactions on Antennas and Propagation, vol. 64, No. 7, pp. 2914-2922 (2016).
Naishadham et al., "A Shared-Aperture Dual-Band Planar Array With Self-Similar Printed Folded Dipoles," IEEE Transactions on Antennas and Propagation, vol. 61, No. 2, pp. 606-613 (2013).
Ferrando-Rocher et al., "A Dual-Polarized Slotted-Waveguide Antenna Based on Gap Waveguide Technology," 11th European Conference on Antennas and Propagation EUCAP, Paris, 3 pages (2017).
Gorski et al., "Wideband, Low Profile and Circularly Polarized K/Ka Band Antenna," IEEE European Conference on Antennas and Propagation (EuCAP), Lisbon (Portugal), 3 pages (Apr. 13-17, 2015).
Singh et al., "Dual resonance shorted stub circular rings metamaterial absorber," International Journal of Electronics and Communications, 9 pages (2017).
Salim et al., "A Dual-Band BPF Based on Asymmetrical-Meandered Configuration for Communication Systems," 2018 Third Scientific Conference of Electrical Engineering (SCEE), 5 pages (2018).
Mollaei et al., "Three Bands Substrate Integrated Waveguide Cavity Spatial Filter With Different Polarizations," IEEE Transactions on Antennas and Propagation, vol. 65, No. 10, pp. 5628-5632 (2017).
Zhao et al., "An FSS Structure Based on Parallel LC Resonators for Multiband Applications," IEEE Transactions on Antennas and Propagation, vol. 65, No. 10, pp. 5257-5266 (2017).
Dickie et al., "Low-Pass FSS for 50-230 GHz Quasi-Optical Demultiplexing for the MetOp Second-Generation Microwave Sounder Instruments," IEEE Transactions on Antennas and Propagation, vol. 65, No. 10, pp. 5312-5321 (2017).
Wu et al., "Design of Novel Dual-band Bandpass Filter with Microstrip Meander-loop Resonator and CSRR DGS," Progress in Electromagnetics Research, vol. 78, pp. 17-24 (2008).
Marzah et al., "Design and Analysis of High Performance and Miniaturized Bandpass filter using Meander Line and , Minkowski Fractal Geometry," Al-Mansour International Conference on New Trends in Computing, Communication, and Information Technology, NTCCIT pp. 12-17 (2018).

* cited by examiner

MULTIBAND RESONATOR ELEMENT FOR MAKING FILTERS, POLARIZERS AND FREQUENCY-SELECTIVE SURFACES

CROSS-REFERENCE TO RELATED APPLICATIONS

This application is the U.S. National Stage of International Application No. PCT/ES2020/070686 filed on Nov. 6, 2020, which claims the benefit of priority from Spanish Patent Application No. P201930982 filed on Nov. 8, 2019, the contents of which are both herein incorporated by reference in their entirety.

TECHNICAL FIELD

Electronics, Information and communication technologies, Aeronautical and naval technologies, Materials technologies, Agricultural and forestry technologies, Industrial technology and production.

DESCRIPTION OF THE RELATED ART

There is at present a need to provide solutions for improving current antenna systems for satellite communications and meeting current and future requirements, in particular fine pointing, low-profile and low-weight requirements. These requirements are essential if antenna systems for mobile SATCOM applications are to take a position on the market such that satellite communications systems become competitive under different scenarios.

The technology of phased array antennas, or electronically oriented or electronically scanned antennas, promises the implementation of flat antennas as a solution to low-profile requirements for any type of vehicle, i.e. perfect for low-profile and moving communications systems, but opinions differ as to their commercial viability.

Until now, these flat (or phased array) antennas have been prohibitively expensive and mostly limited to military use. However, at least two companies, Phasor, Inc. (www.phasorsolutions.com) and Kymeta Corp. (www.kymetacorp.com) are developing new technologies and new approaches to bring low-profile antennas to market.

Phasor's core technology uses ASIC microprocessors, wherein each ASIC is linked to a radiating "element", creating an electronically-steered beam antenna. Moreover, as this system immediately converts signals to digital, the architecture supports scalability in unlimited theory, without traditional losses associated with analog systems.

Kymeta's metamaterial technology is a patented and novel application of a new field in materials science. Indeed, metamaterials have "bent" radio waves to achieve electronically-steered antenna functionality. This, together with a polarizing "film" covering the antenna, allows connectivity with the communications satellites.

These designs, some in bands other than the K/Ka bands and others that simply propose an array of antennas or aperture for each frequency band, still do not propose a dual-band and dual-polarization solution that allows drastically reducing the volume, weight and cost of antenna systems for mobile or fixed satellite communication terminals. In this regard, new antenna solutions and technologies need to be explored.

Work has been done to find innovative solutions to provide antenna systems capable of providing beam scanning in ultra-compact systems.

In the state of the art we find scientific articles that present arrays of dual-band antennas with different elements that share the aperture of the antenna system. The feed of the antenna elements in these cases can be diverse, although they do not optimize the performance that a slot-coupling feed can offer. On the other hand, there are patents that propose dual-band and multiband radiating elements, and elements with dual-polarization. Below, we set out the discussion of the state of the art with the significant elements that can objectively compare dual-band and dual-polarization radiating elements in terms of their design characteristics, specifications and performance.

In [1] the authors propose a radiating element for antenna arrangement. This element is designed to work in the L and C bands and the SAR (Synthetic Aperture Radar) system for which the element is designed requires a range of beam sweep angles of +/−25 degrees. In [2], the authors present a design of a grouping of antennas whose radiating elements share an aperture, i.e. which has in the same antenna aperture a radiating element for the transmission band and another element for the reception band. For this, they overlap the transmission and reception elements in certain positions and thus share the area of the aperture. These elements of [2] transmit the signal through a rectangular slot to a circular cavity formed by pins in the case of the element that does not share a position. In the case of the elements that share position, for the high band the structure is repeated while for the low band the authors propose a coaxial cavity structure that surrounds the higher frequency element. Authors in [3] propose an antenna array system for dual-band, dual-polarization synthetic aperture radars. As in the previous case, the array of antennas is composed of two elements that work in different bands but that share the area of the antenna aperture. The operating bands of this antenna system are the C and X bands. With the same philosophy of sharing the area of the antenna aperture with different elements tuned in the different working bands, the authors in [4] propose an array of antennas to work in the 1 and 2 GHz frequency bands with dipoles bent in C and arranged specularly as radiating elements. The feeding of the elements is direct by means of a coaxial port to each pair of dipoles. The authors in [5] propose a dual-polarization element working in a single band (V) with a multi-layer waveguide structure based on Gap Waveguide Technology. These radiating elements do not show an optimization of the performance in terms of polarization purity or axial ratio appropriate for applications of low pointing or arrival directions.

As regards radiating elements presented in the prior art individually for later use in antenna arrangements for no other purpose, hereunder we present the patented elements related to the Invention. The authors in [6] present a complementary element fed by a rectangular slot which in turn is fed by a structure in microstrip. This element is single band and single linear polarization, but shows the concept of slot feeding. In [7], a dual-band antenna is proposed for antenna arrangements adapted by phase differences, but they use an antenna arrangement for each frequency band and these are differentiated by a diplexer. On the other hand, the authors in [8] propose a compact element of single circular polarization, but of dual-band that comprises a passive power divider in microstrip technology that crossed-slot feeds and with these it is coupled to a rectangular patch with multi-resonant elements. On the other hand, a dual-band radiating element for a synthetic aperture radar is presented in [9], In this case, they propose a feed to the radiating elements through a square slot or cavity that excites a ring-shaped slot. The latter does not have resonant elements to make a selection of the bands in the aperture. In [10], similar to what they used in the previous case to separate the frequency bands, in the reference patent they propose exciting one of the frequencies through an inductive coupling, while the other frequency is performed by capacitive proximity coupling. In both frequencies microstrip lines are used to feed the single polarization radiating element. In [11], the invention relates to a dual-polarization radiating element with a lower patch for radiating in a first polarization and a second patch for radiating in a second orthogonal polarization. Furthermore, the invention relates to a dual-band dual-polarization antenna assembly sharing aperture area. In [12], the authors present a dual stacked patch as a dual-band solution in K and Ka. This solution proposes feeding the active patch by means of a cross-shaped slot that limits, unlike the circular slot proposed in the present patent presented in [13], the sequential feeding to only four points.

Regarding the embodiments in frequency-selective surfaces such as reflectarrays and transmitarrays, as well as in dichroic subreflectors and metasurfaces, we find the following developments in the state of the art. In [14] a ring loaded with stubs of two types is configured, some of the "switch" type and others without "switch", in this way they can "connect" or "disconnect" stubs from the ring according to the system's requirements; the reason for having stubs without a switch is to change the effective diameter of the ring and its response, which, through the different configurations thereof, different resonance frequencies and reflective responses are achieved. In [15] a ring is designed with two short stubs loaded with a small rectangular section, with these last two components the two resonance frequencies that appear in the design of this element are modified. On the other hand, the authors in [16] present a dual-band element for frequency-selective surfaces based on parallel arranged LC resonators. This element requires the implementation of metallized tracks and multiple resonant structures on both sides, making its manufacture complex and expensive. It is important to highlight that the authors demonstrate that with a structure the bandwidth obtained is narrow band, and that to obtain a broadband transmission with this structure it is necessary to implement resonant structures at different frequencies in a unit cell.

The authors in [17] present the design of a dichroic surface that works in frequencies from 50.2 GHz to 230 GHz for the instrument on board the MetOp second-generation satellite. For this design, the authors propose C-shaped elements that form two multiresonant slots: one straight and one ring-shaped. This element is not appropriate for all oblique incidents as they do not only vary from Theta but also from Phi. On the other hand, the authors in [18] present a complex element for its manufacture that is used for the design of frequency-selective surfaces in three-band systems. This element is based on SIW (Substrate Integrated Waveguide) technology forming a cavity with rectangular iris filter.

None of the above works resolves, on the one hand, the optimization of the axial ratio for low observation angles of a unitary radiating element, as well as the implementation of a multiband dichroic surface with the flexibility of configuring the transmission and reflection bands.

BRIEF SUMMARY OF THE INVENTION

The present invention, which is based on a multiband resonator element, resolves the aforementioned problems, improving the axial ratio within an enlarged viewing cone of the radiating element under analysis and allowing multiband dichroic subreflector designs, as well as in the implementation of multiband filters in cavity as a resonant element.

This improvement of the axial ratio consists of obtaining a circular polarization purity less than or equal to 2 dB for an observation range of +/−75 degrees with respect to the axis or "broadside". On the other hand, the multiband subreflectors can be made for bands S, C, X, Ku, K, Ka, etc. Being limited in the upper bands by the physical dimensions and the manufacturing technologies available. These multiband embodiments may contain, for example, bands S, C, and Ku, or bands X, K, and Ka, depending on the application and configuration of the antenna system with dichroic subreflector under design.

This resonator element is formed by a series of stubs adjusted in frequencies and arranged radially on what would be a ring, thus making a ring of stubs, or linearly on the four sides on what would be a rectangle, thus forming a rectangle of stubs.

For the case of application in the aperture of radiating elements to improve the axial ratio of radiating elements or antennas, the length of the stubs, the width and spacing of the tracks, and the radius of the ring that they form, control the adaptation of the patch with the medium in the aperture of the antenna system and optimize the axial ratio with respect to the axis of symmetry or "broadside" direction as explained above.

For the case of application in dichroic subreflectors, the length of the stubs adjusts the central band, while the separation of the tracks of the stubs adjusts the central and upper bands. The radius of the ring formed by the stubs adjusts the lower and upper bands. Finally, another important variable for the design of a dichroic subreflector, using any resonator, is that of the period of the cell used. This variable, for the specific case of the invention presented here, adjusts all the bands, but with its greatest impact on the lower and upper bands. With this set of parameters and guidelines it is possible to design the resonant element within a periodic cell for implementation in a dichroic subreflector working on a set of specific bands.

In order to maximize transmission in a dichroic subreflector, it is demonstrated that it must have symmetry with respect to the impedances seen on both sides of it, and these must be spaced at an effective distance of half a wavelength. It is then possible to implement two classes of dichroic subreflectors, one symmetrical with two resonators formed by stubs on both faces, or one non-symmetrical with a resonator formed by stubs on one face and one smooth resonator ring on the other face.

The symmetrical configuration allows the lower and upper bands to be adjusted in reflection, while the central one is adjusted in transmission. On the other hand, the non-symmetrical configuration allows adjusting the lower band in transmission, while the central and upper bands in reflection. Referring to reflection, to the capacity of reflecting the electromagnetic waves on the surface of the dichroic subreflector, whilst, to transmission, to the capacity to transmit the electromagnetic waves through it.

BRIEF DESCRIPTION OF THE SEVERAL VIEWS OF THE DRAWINGS

To complement the description of the invention and for the purpose of aiding the better understanding of its characteristics, in accordance with a preferred example of embodiment thereof, a set of drawings is attached wherein, by way of illustration and not limitation, the following figures have been represented.

DETAILED DESCRIPTION OF THE INVENTION

With reference to the numbering adopted in the figures described above, the description of the present invention will be described in greater detail, which is based on a multiband resonator element, such as that represented in FIG. 1, which is formed by a series of stubs (13.*a* or 13.*b*) adjusted in frequencies and arranged on what would be a ring or a rectangle, thus making a ring or rectangle of stubs.

Figure 2:
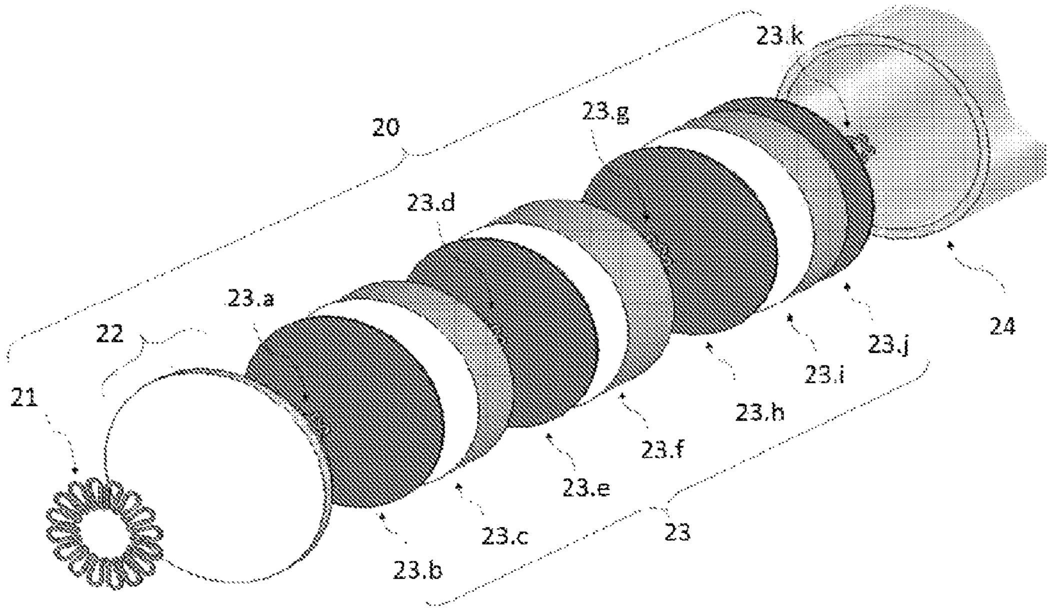
FIG. 2 shows a possible embodiment of the dual-band and dual-polarization radiating element (20) formed with a resonator with C-type sections joined with stubs (21) formed with copper lines, it is superimposed on a corrugated cone of a Teflon-type material (22), in order to adapt the impedance seen inside the cavity (24) with the one outside the resonator, inside the cavity there is a filter (23) formed by 4 circular resonators (23.*a*, 23.*d*, 23.*g* and 23.*k*) the same as those of FIG. 1, supported on a layer of ceramic dielectric (23.*b*, 23.*e*, 23.*h* and 23.*j*), and separated with a foam-type material (23.*c*, 23.*f* and 23.*i*), whose purpose is to decrease the distance between each filter of the cavity by the dielectric constant of the latter, even if it is close to one. Therefore, with dielectric materials of higher dielectric constant, we will obtain a more compact filter, but this can significantly increase the losses. This design obtains circular polarizations with a purity less than or equal to 2 dB for all angles belonging to the viewing cone centred on "Broadside". The feeding of the design could be carried out by different techniques, such as for example by capacitive coupling with a feeder formed by a stub and a slot.

This element may be implemented to improve the axial ratio within an enlarged viewing cone of the radiating element under analysis, such as that shown in FIG. 2, consisting of an iris filter 23.*a*, 23.*g*, 23.*d*, and 23.*k*, in the dielectric load at aperture 22 which may be a shaped or corrugated cone, in a cavity 24 containing the foregoing elements, for working at two separate frequencies, and the multiband resonator element at aperture 21 which improves the ratio between the field components for large angles relative to the axis or elevation angles. This improvement of the axial ratio consists of obtaining a circular polarization purity less than or equal to 1.5 dB for an observation range of +/−75 degrees, or less than or equal to 2 dB for an observation range of +/−85 degrees, with respect to the axis or "broadside" or axis.

This element can also be implemented in multiband dichroic subreflector designs. These multiband subreflectors can be made for virtually any band ratio with the normalized frequency response shown in FIGS. 6 and 7, for the non-symmetrical and symmetrical configurations, respectively. These bands may be, for example: [S, C, X], [Ku, K, Ka], [X, K, Ka], etc. These implementations in dichroic subreflectors being limited in the upper bands by the physical dimensions and manufacturing technologies available.

Figure 1:
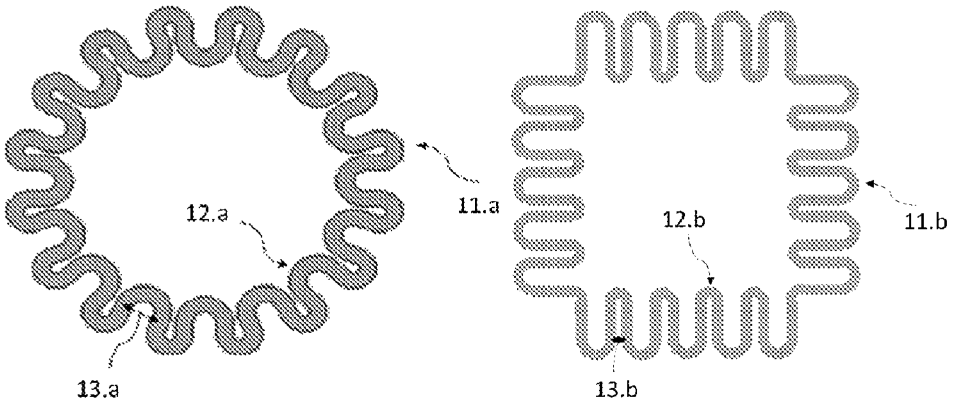
FIG. 1 shows the resonator element formed by a series of stubs (13.*a* or 13.*b*) adjusted in frequencies and arranged radially between inner rings (12.*a*) and outer rings (11.*a*), thus forming a ring of stubs. They can also be arranged linearly on the four sides of a rectangle, with lower rings (12.*b*) and outer rings (11.*b*), thus forming a rectangle of stubs.

For the case of application in the aperture of radiating elements to improve the axial ratio of radiating elements or antennas, the length of the stubs in FIG. 2, the width and spacing of the nearest tracks in FIG. 1, and the radius of the ring that the set of stubs forms, are adjusted to improve adaptation of the resonant patch or cavity with the medium at the antenna aperture. In addition, they optimize the axial ratio with respect to the axis of symmetry or direction of "broadside" as explained above.

Figure 3:
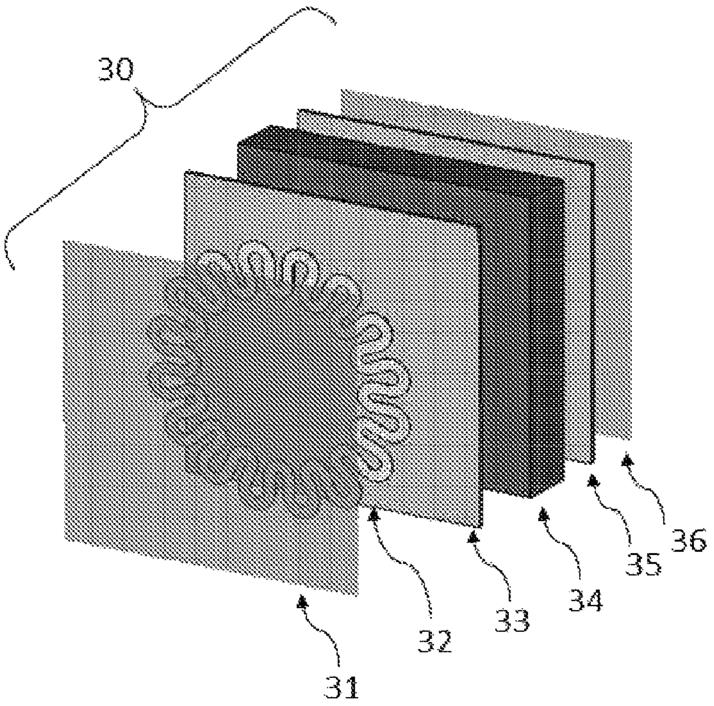
FIG. 3 shows the design of the unit cell (30) that would configure a frequency-selective surface, to be used in dichroic subreflectors. The component (31) is a layer of dielectric material (e.g kapton), it is located in front of the copper resonator (32) to protect it from possible deterioration due to weather phenomena, then there is another layer of dielectric material (e.g. kevlar) (33) and as in FIG. 2 a foam or honeycomb type material (34) is placed to adjust the space with the next layer of "kevlar" (35) and "kapton" (36).

In the case of application in dichroic subreflectors, we can start from the resonator of FIG. 1, but now adding to this element (32) the layers corresponding to the dielectric materials, which can be, according to design and for a manufacture with classic technology of the embodiment presented in FIG. 3: Kapton (31), Kevlar (33), Foam or Honeycomb (34), Kevlar (35), and Kapton (36). These materials may change depending on the selected manufacturing technique or technology. Now, the length of the stubs adjusts the central band of FIG. 6, while the separation of the tracks of the stubs adjusts the central and upper bands of FIG. 6. The radius of the ring formed by the stubs adjusts the lower and upper bands of FIG. 6. Finally, another important variable for the design of a dichroic subreflector, using any resonator, is that of the period of the cell used (symmetrical sides of the cell of FIGS. 3, 4 and 5). This variable, for the specific case of the invention presented here, adjusts all the bands, but it is its greatest impact on the lower and upper bands. With this set of parameters and knowing its effects on the response of the element, it is possible to design the resonant element within a periodic cell for implementation in a dichroic subreflector working on a set of specific bands.

Figure 4:
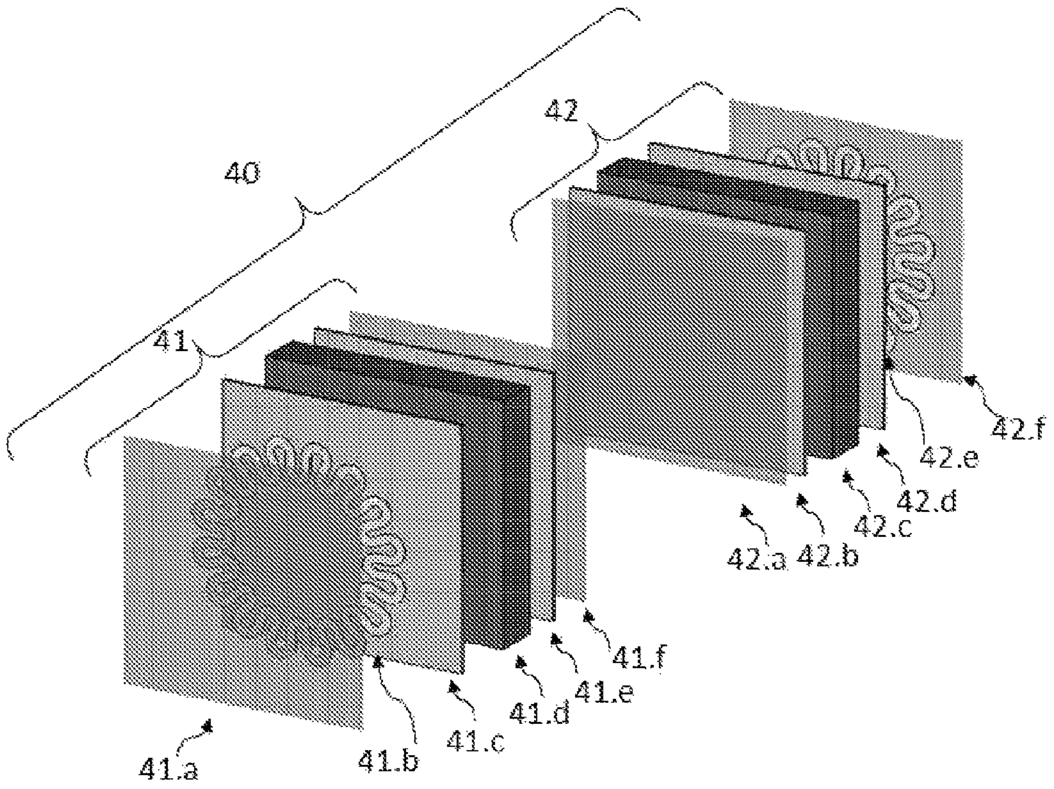
FIG. 4 shows the two unit cells (40), formed by two elements that are the same as those of FIG. 3, placed opposite one other, being the same element, the distance that separates element (41) from (42) is approximately half a wavelength because its impedances are the same. The layers that make up the two cells are: (41.*a*) and (42.*f*) consisting of a layer of dielectric material (e.g. kapton), (41.*b*) and (42.*e*) which are the copper resonator, (41.*c*) and (42.*d*) are another layer of dielectric material (e.g. kevlar), (41.*d*) and (42.*c*) are a foam or honeycomb type material, (41.*e*) and (42.*b*) are again a "kevlar" layer, and finally layers (41.*f*) and (42.*a*) are a new "kapton" layer. This distribution is used on a frequency-selective dichroic surface of a communications system which can work simultaneously in both transmission and reflection, having a dual working band in the case of reflection, and a working band in the case of transmission, the two reflection bands being separated from each other by the transmission band. The two reflection bands could be fed by a coaxial system, having the advantage of a simpler feeder design than is necessary for FIG. 4 since the two frequency bands reflecting the signal are more spaced out from one other. For the feed of the transmission band, any feeder dedicated to the band to which it has been tuned could be used.
Figure 5:
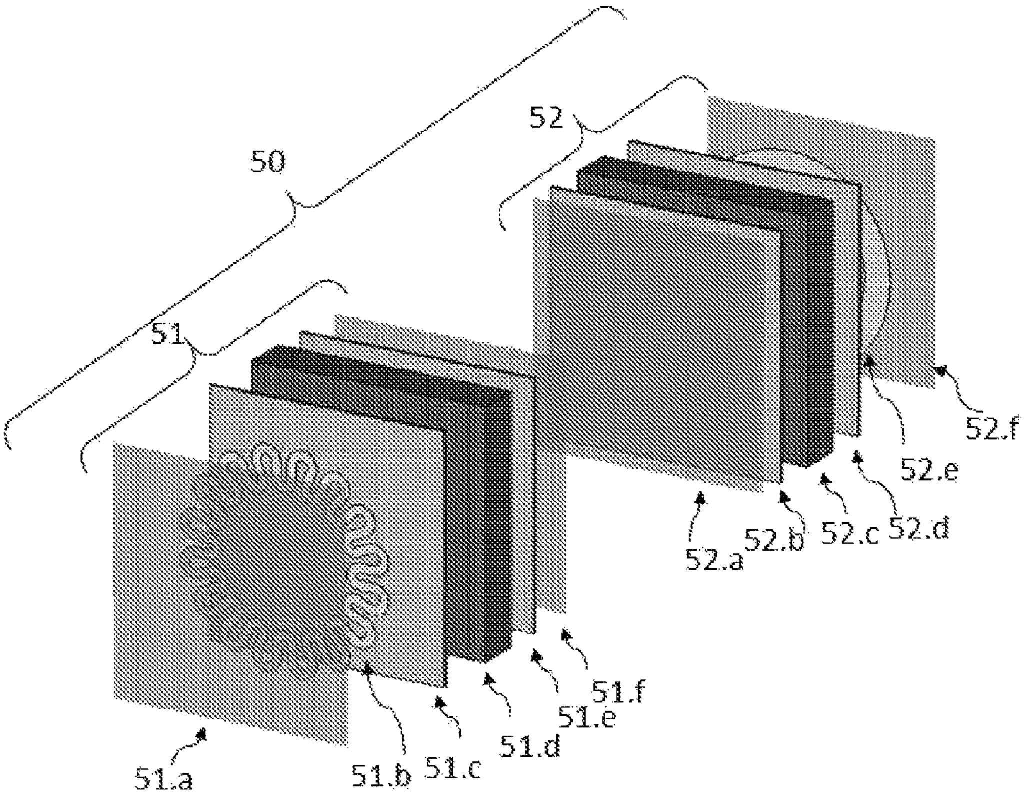
FIG. 5 shows two symmetrical unit cells (50); this design has a variation with respect to FIG. 4, and it is the replacement of the resonator element (42.*e*) by a ring (52.*e*), the layers that form the design are: (51.*a*) and (52.*f*) consisting of a layer of dielectric material (e.g., kapton), (51.*b*) copper resonator, and (52.*e*) which is a copper ring, (51.*c*) and (52.*d*) are another layer of dielectric material (e.g. kevlar), (51.*d*) and (52.*c*) are foam or honeycomb type material, (51.*e*) and (52.*b*) is again a layer of "kevlar," and finally layers (51.*f*) and (52.*a*) are a new layer of "kapton." In this case the distance that separates element (51) from (52) is not half a wavelength, since the impedance of the ring (52.*e*) is not the same as that of the resonator element (51.*b*), so this distance will vary depending on the specifications to be obtained. With this variation, the unit cells placed on a frequency-selective dichroic surface of a communications system that can act simultaneously in transmission and reflection are obtained, having in this case dual reflection work band and a work band for transmission, in this case the two reflection bands are closer than in the case of FIG. 4 the reflection bands. For the feeding of the reflection bands, the same strategy would be used as that proposed for FIG. 4, or a dual-band non-coaxial feeder. For the transmission band the same strategy is followed as for FIG. 4.

In order to maximize transmission in a dichroic subreflector, it is demonstrated that it must have symmetry with respect to the impedances seen on both sides thereof, and these must be spaced at an effective distance of approximately half a wavelength in practice as depicted in FIGS. 4 and 5. Thus, it is possible to implement two classes of dichroic subreflectors based on the multiband resonator elements of FIG. 1 and the periodic cell of FIG. 3. That is, a symmetrical one with two resonators formed by "stubs" 41.*b* and 42.*e* on both sides in FIG. 4, or a non-symmetrical one with a resonator formed by "stubs" 51.*b* on one side and a smooth resonator ring 52.*e* on the other side in FIG. 5.

Figure 6:
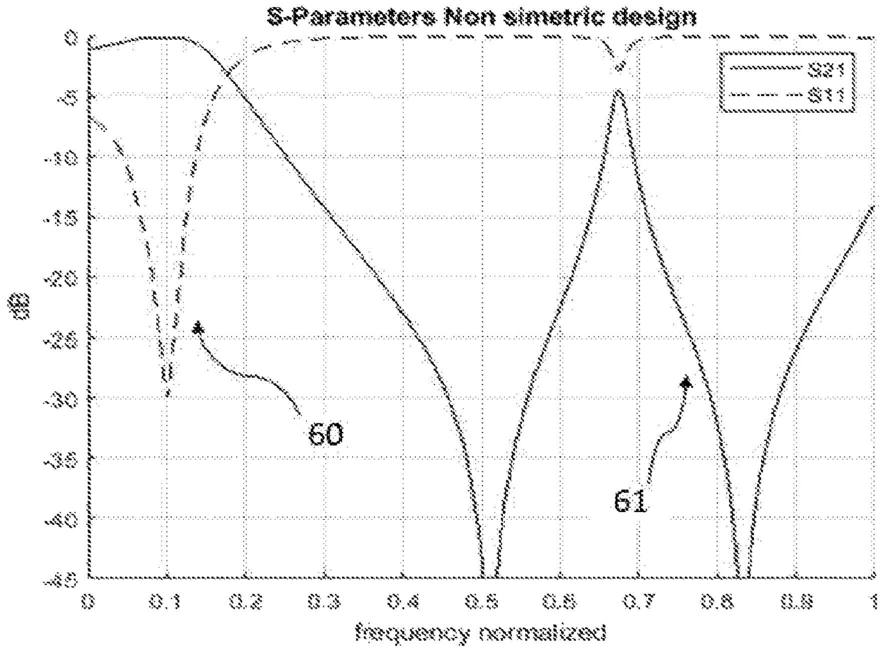
FIG. 6 shows the response in adaptation (60) and reflection (61) of the design of FIG. 5, thus showing the three operating frequencies: two for reflection (61) and one for transmission (60).
Figure 7:
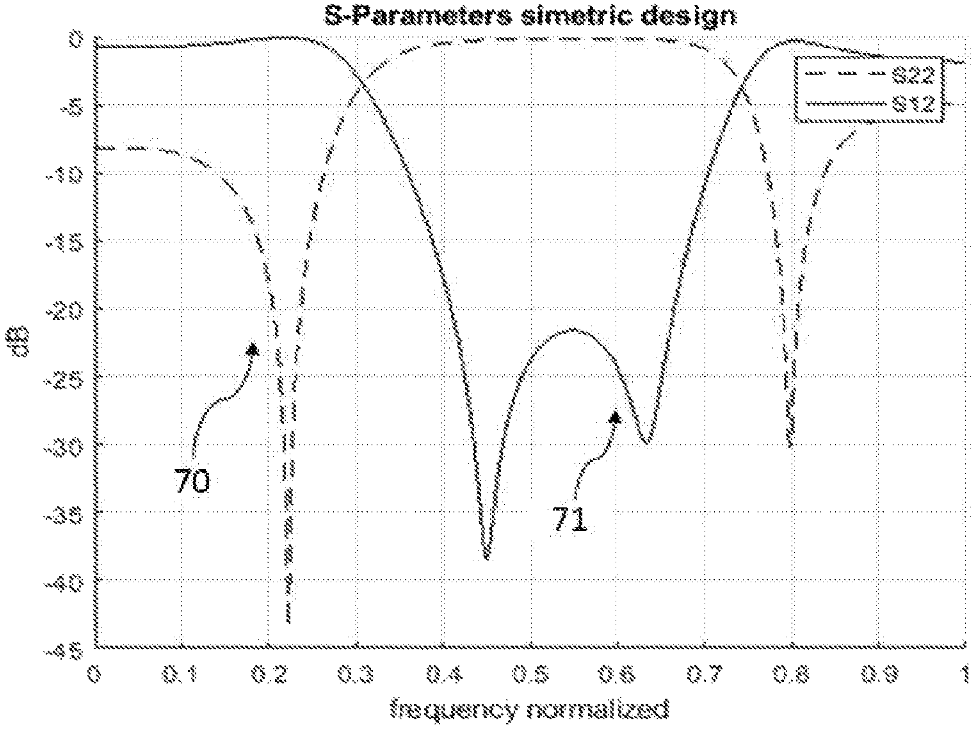
FIG. 7, shows the response in adaptation (70) and reflection (71) of the design of FIG. 4, thus showing the three operating frequencies: two for transmission (70) and one for reflection (71).
Figure 8:
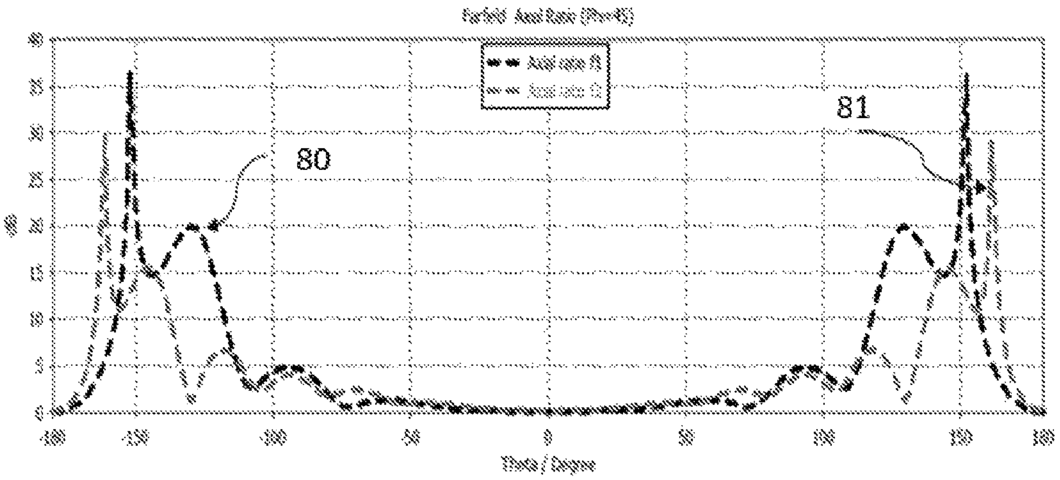
FIG. 8 shows the axial ratio response optimized by the resonant element as a polarizer aperture, for the first design frequency (80) and the second design frequency (81), of FIG. 2.

The symmetrical configuration allows the lower and upper bands to be adjusted in reflection, while the central one is adjusted in transmission as can be seen in FIG. 7. On the other hand, the non-symmetrical configuration allows adjusting the lower band in transmission, while the central and upper bands in reflection as can be seen in FIG. 6.

Figure 9:
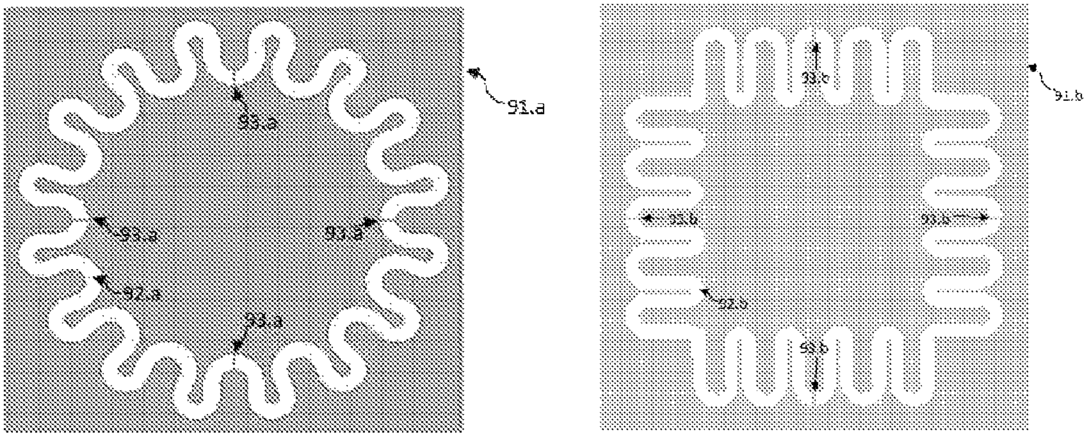
FIG. 9 shows the negative image of the two resonant elements presented in FIG. 1, i.e. in the circular resonator, the new metal section is (91.*a*), while (92.*a*) is of air or in a slot of a metal structure, in the same way in the rectangular resonator, due to the structure of the design, metal lines (93.*a*) must be added to support the interior part of the design. Incorporation of these lines does not significantly affect the radiation characteristics of the element. Likewise, in the square design the new metal section is (91.*b*) and the air section is (92.*b*), it is also necessary to incorporate the metal lines (93.*b*) to be able to support the Inner part.
Figure 10:
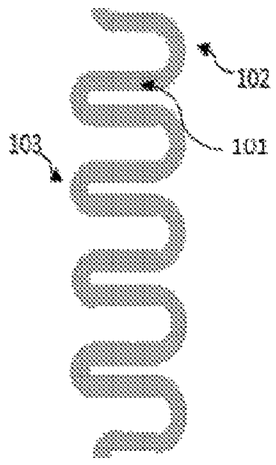
FIG. 10 shows a multiband dipole that can be implemented as a complement to the above resonators by joining two half-rings (102) and (103) through a stub (101), both in copper and in its negative (slot) version.

For the above, the slots shown in FIG. 9 can also be implemented, to implement different designs and manufacturing techniques. Likewise, the adjustable dipole of FIG. 10 can be introduced into the above elements depending on the polarization of the system and its multiband application.

REFERENCES

[1] W. C. G. S. a. N. S. L. Shafai, «Dual Band Dual Polarized Radiating Element Development,» de ANTEM'96, 1996.

[2] A. Imran Sandhu, E. Arnieri, G. Arriendóla, L. Boccia, E. Meniconi y V. Ziegler, «Radiating Elements for Shared Aperture Tx/Rx Phased Arrays at K/Ka Band,» IEEE Transactions on Antennas and Propagation, vol. 64, no 6, pp. 2270-2282, 2016.

[3] S. G. Fan Qin, L. Qi, M. Chun-Xu, G. Chao, W. Gao, X. Jiadong y L. Janzhou, «A Simple Low-Cost Shared-Aperture Dual-Band Dual-Polarized High-Gain Antenna for Synthetic Aperture Radars,» IEEE Transactions on Antennas and Propagation, vol. 64, no 7, pp. 2914-2922, 2016.

[4] K. Naishadham, R. Li, L. Yang, T. Wu y W. Hunsicker, «A Shared-Aperture Dual-Band Planar Array With Self-Similar Printed Folded Dipoles,» IEEE Transactions on Antennas and Propagation, vol. 61, no 2, pp. 606-613, 2013.

[5] M. Ferrando-Rocher, A. U. Zaman, J. Yang y A. Valero-Nogueira, «A Dual-Polarized Slotted-Waveguide Antenna Based on Gap Waveguide Technology,» de 11 th European Conference on Antennas and Propagation EUCAP, Paris, 2017.

[6] R. J. Coe, «Parasitically Coupled Complementary Slot-dipole Antenna Element». U.S. Pat. No. 4,710,775, December 1987.

[7] B. Kuan M. Lee, F. Nam S. Wong, C. Ruey S. Chu y F. Ray Tang, «DUAL BAND PHASED ANTENNA ARRAY USING WIDEBAND ELEMENT WITH DIPLEXER». U.S. Pat. No. 4,689,627, August 1987.

[8] C.-H. A. T. Saratoga, «Dual Frequency Circularly Polarized Microwave Antenna». U.S. Pat. No. 5,241,321, 31 Aug. 1993.

[9] P. C. Strickland, «POLARIMETRIC DUAL BAND RADIATING ELEMENT FOR SYNTHETIC APERTURE RADAR». U.S. Pat. No. 5,952,971, 14 Sep. 1999.

[10] B.-j. Lee y et al., «BROADBAND DUAL-POLARIZED MICROSTRIP ARRAY ANTENNA». U.S. patent application Ser. No. 10/476,410, 24 Jun. 2004.

[11] B. Carmen y A. Teillet, «DUAL-POLARIZED RADIATING ELEMENT, DUAL-BAND DUAL-POLARIZED ANTENNA ASSEMBLY AND DUAL-POLARIZED ANTENNA ARRAY». U.S. Pat. No. 8,354,972 B2, 15 Jan. 2013.

[12] Przemyslaw Gorski, Joana S. Silva, y Juan R. Mosig, «Wideband, Low Profile and Circularly Polarized K/Ka Band Antenna». IEEE European Conference on Antennas and Propagation (EuCAP), Lisbon (Portugal), 13-17 Apr. 2015.

[13] M. Salas-Natera, M. Barba Gea, y J. Encinar Garcinuño, «Elemento Radiante de Doble Banda y Doble Polarización Multi-propósito», Referencia de patente: ES-2017003144220171220, 2017

[14] R. Martinez-Lopez, J. Rodriguez-Cuevas, A. E. Martynyuk y J. I. Martinez-Lopez, «An active Ring Slot With RF MEMS Switchable Radial Stubs for Reconfigurable frequency Selective Surface Applications», México D.F.: Factulty of Engineering, National Autonomous University of México, 2012.

[15] D. Singh y V. M. Srivastava, «Dual resonance shorted stub circular rings metamaterial absorber». International Journal of Electronics and Communications, 2017.

[16] Peng-Chao Zhao, Zhi-Yuan Zong, Wen Wu, Bo Li, y Da-Gang Fang, «An FSS Structure Based on Parallel LC Resonators for Multiband Applications». IEEE Transactions on Antennas and Propagation, vol. 65, no 10, pp. 5257-5266, 2017.

[17] Raymond Dickie, Steven Christie, Robert Cahill, Paul Baine, Vincent Fusco, Kai Parow-Souchon, Manju Henry, Peter G. Huggard, Robert S. Donnan, Oleksandr Sushko, Massimo Candotti, Rostyslav Dubrovka, Clive G. Parini, and Ville Kangas, «Low-Pass FSS for 50-230 GHz Quasi-Optical Demultiplexing for the MetOp Second-Generation Microwave Sounder Instrument». IEEE Transactions on Antennas and Propagation, vol. 65, no 10, pp. 5312-5321, 2017.

[18] M. Sharifian Mazraeh Mollaei and S. H. Sedighy, «Three Bands Substrate Integrated Waveguide Cavity Spatial Filter With Different Polarizations». IEEE Transactions on Antennas and Propagation, vol. 65, no 10, pp. 5628-5632, 2017.

The invention claimed is:

1. A cavity filter comprising a plurality of resonator elements, wherein each resonator element comprises a plurality of stubs adjusted in frequency and arranged according to a geometric shape to be selected from an ellipse or a rectangle, wherein each resonator element is disposed on a layer of dielectric material and separated from each other by a layer of foam-type material or air, wherein the dielectric materials include a variable dielectric constant to change the working frequency or its phase response, to perform low-pass, high-pass, band-pass or multiband-pass filters.

2. A radiating element formed by the filter cavity according to claim 1 for single or multiband applications.

3. A radiating element comprising a resonator element, wherein the resonator element comprises a plurality of stubs adjusted in frequency and arranged according to a geometric shape to be selected from an ellipse or a rectangle, wherein the radiating element further comprises an aperture polarizer configured to improve the axial ratio of the circular polarization of the radiating element up to angles of 90 degrees from a broadside axis.

4. A frequency-selective surface for one or multiple bands formed by a plurality of periodic cells each comprising:

a resonator element, wherein each resonator element comprises a plurality of stubs adjusted in frequency and arranged according to a geometric shape to be selected from an ellipse or a rectangle, wherein the frequency-selective surface further comprises a dielectric material with a variable dielectric constant.

5. A resonator element comprising:

a plurality of stubs adjusted in frequency and arranged according to a geometric shape to be selected from an ellipse or a rectangle wherein the resonator element further comprises an adjustable dipole to favour a polarization or application.

* * * * *